United States Patent [19]

Katoh et al.

[11] Patent Number: 4,957,677
[45] Date of Patent: Sep. 18, 1990

[54] PROCESS FOR PRODUCING COMPOSITE LAMINATE COMPRISING INSERT PART AND INJECTION-MOLDED PART

[75] Inventors: Naoyuki Katoh; Masahiro Aoki; Takeo Tsukamoto, all of Yokkaichi, Japan

[73] Assignee: Mitsubishi Yuka Badische Co., Ltd., Yokkaichi, Japan

[21] Appl. No.: 244,106

[22] Filed: Sep. 14, 1988

[30] Foreign Application Priority Data

Dec. 9, 1987 [JP] Japan ................. 62-311731
Dec. 9, 1987 [JP] Japan ................. 62-311732
May 9, 1988 [JP] Japan ................. 63-112114

[51] Int. Cl.$^5$ .................... B29C 45/14; C09D 4/02
[52] U.S. Cl. .................... 264/135; 264/275; 264/279; 264/331.18; 427/388.2; 427/388.4; 526/329.5
[58] Field of Search ............ 264/134, 135, 275, 279, 264/331.18, 331.21, 331.22; 427/388.1, 388.2, 388.4; 526/329.5

[56] References Cited

U.S. PATENT DOCUMENTS

| | | | |
|---|---|---|---|
| 3,224,908 | 12/1965 | Duch et al. | 427/388.4 |
| 3,503,918 | 3/1970 | LeSota et al. | 427/388.4 |
| 4,120,839 | 10/1978 | Emmons et al. | 526/329.5 |
| 4,136,075 | 1/1979 | Finn et al. | 427/388.1 |
| 4,724,111 | 2/1988 | Iwata et al. | 264/279 |

FOREIGN PATENT DOCUMENTS

| | | | |
|---|---|---|---|
| 3047191 | 7/1982 | Fed. Rep. of Germany | 264/279 |
| 0086717 | 7/1981 | Japan | 264/135 |
| 1010413 | 1/1986 | Japan | 264/279 |

Primary Examiner—Jan H. Silbaugh
Assistant Examiner—Catherine Timm
Attorney, Agent, or Firm—Oblon, Spivak, McClelland, Maier & Neustadt

[57] ABSTRACT

A process for producing a composite laminate comprising a insert part and an injection-molded resin part by coating the insert part with a primer comprising a copolymer aqueous emulsion having a glass transition point of not higher than 20° C. which is obtained by emulsion polymerization of a monomer mixture consisting mainly of (a) from 35 to 75% by weight of an alkyl acrylate having from 1 to 8 carbon atoms in the alkyl moiety thereof, (b) from 10 to 50% by weight of an alkyl methacrylate having from 1 to 4 carbon atoms in the alkyl moiety thereof, (c) up to 15% by weight of styrene and/or acrylonitrile, the sum of the (b) and (c) components ranging from 15 to 55% by weight, (d) up to 5% by weight of a vinyl monomer selected from the group consisting of an $\alpha,\beta$-unsaturated acid or an anhydride thereof, 2-hydroxyethyl (meth)acrylate, 2-hydroxypropyl (meth)acrylate, (meth)acrylamide, and methylol(meth)acrylamide, and (e) up to 30% by weight of other vinyl monomer(s), drying the primer, inserting the insert part into a cavity of an injection mold, injecting a molten resin into the cavity to thereby unite the insert part and the injected resin molded part into one body. The composite laminate is resistant to thermal shocks or electrical shocks.

7 Claims, 4 Drawing Sheets

PROCESS FOR PRODUCING COMPOSITE LAMINATE COMPRISING INSERT PART AND INJECTION-MOLDED PART

FIELD OF THE INVENTION

This invention relates to a process for producing a composite laminate comprising insert part made of plastics, ceramics, metal, etc., and an injection-molded resin part. More particularly, it relates to a process of bonding a plastic or metallic insert and an injected resin.

The composite laminates to which the present invention can be applied include automobile parts, e.g., lampsockets, distributor caps, ignition coils, fuse-boxes, various switches, brackets, bobbins, intake temperature control bulbs, bimetal vacuum switching bulbs, vacuum control bulbs, etc.; metal-inserted resin electrical parts, e.g., gasoline tanks, resin-coated steel plates, resin-coated metallic pipes, connectors, block terminal brackets, coil bobbins, tunner part relays, sockets, switches, motor cases of sewing machines, mounting terminals of trunking terminals, fuse-boxes, condenser cases, chassis of CD players, etc.; pump casings, outer bodies of cameras, packings, and the like.

BACKGROUND OF THE INVENTION

Among a wide variety of thermoplastic resins developed in recent years, those called engineering plastics including polyamide, polyester, polycarbonate, polyacetal, polysulfone, polysilicone, polyphenylene oxide, polyimide, ABS, and methacrylate resins generally exhibit excellent performances, such as mechanical strength, heat resistance, creep resistance, chemical resistance, electrical characteristics, dimensional stability, and the like. Many of the engineering plastics can be used under a broad range of conditions in substitution for metals, e.g., iron, zinc, aluminum, etc. For example, polyamide resins have been applied to gasoline tanks.

Some of molded articles of the engineering plastics cannot be produced by means of a single mold. For example, composite laminates comprising a metallic insert, a resin molded part having inserted therein a metallic insert, or a plastic insert (e.g., female screws or coils of complicated shape) and an injection-molded part, such as a composite article comprising a resin pipe and a resin joint, can be produced by setting the insert part in a cavity of an injection mold and then injecting a molten resin into the cavity to unite the insert part and the injected resin into one body.

In order to obtain satisfactory bonding strength between the insert part and the injection-molded part, the insert part is coated previously with a liquid adhesive or a primer, or a surface of a vulcanized rubbery insert part is treated with trichlene or trichloroisocyanuric acid prior to injection molding.

The liquid adhesive or primer to be used include solvent-based polyester resins, liquid-type epoxy resins, ethyene-methacrylic acid copolymer metal salts (e.g., $Zn^+$, $Na^+$ and $K^+$ salts), maleic anhydride-grafted ethylene-vinyl acetate copolymers, styrene-butadiene copolymer latex, polyester aqueous emulsions, polyvinyl acetate aqueous emulsions, liquid phenolic resins, etc.

However, in molded articles having an insert part in which a metallic part is further incorporated as an integral part, molded articles having a complicated shape, or molded articles required to have resistance to pressure or thermal shock, it has recently been pointed out that insufficient laminate bonding strength between the insert part and the injection-molded part causes problems such as leakage of a liquid content from the molded article or destruction of the molded article, even when the insert part and the injected resin are the same in kind or even when an adhesive or primer is applied between the insert part and the injected resin which are different in kind. This problem is particularly acute in small-sized products or products requiring accuracy.

Taking an example of a laminated container composed of a metallic insert part and an engaging plastic injection molded part such as polyacetal, polyamide, polybutylene terephthalate, etc., when the entire inner wall of the metallic plate is coated with engineering plastic as in a resin-coated steel container, some degree of laminate bonding strength would be enough for use as a tank for gasoline, motor oil, petroleum, water, etc.

However, in cases where only a part of a metallic part is covered with engineering plastic as exemplified by an automobile part as illustrated in FIG. 7, when the part is immersed in an liquid, e.g., gasoline, motor oil, water, etc., or dried, or repeatedly receives thermal shock, the liquid tends to enter into the boundary between metallic part 4 and the engineering plastic injection molded part 9 to reduce bonding strength therebetween, which would ultimately result in leakage of the liquid from the laminate. The leakage is more apt to occur on application of pressure (e.g., 0.5 to 3 $kg/cm^2$) to the liquid. This is because the coefficient of thermal expansion of the metal is smaller than that of the engineering plastic so that the resin layer comes to release through repetition of temperature changes between $-20°$ C. and $+80°$ C. (i.e., thermal shock). Depending on the kind of the resin, leakage of the liquid content sometimes occur due to dissolution of the resin in gasoline or motor oil.

Adhesives or primers having a glass transition point of not higher than $-20°$ C. and providing a film having an elongation of 1500% or more, such as an acrylonitrile-butadiene copolymer aqueous emulsion (Tg: $-25°$ C.) or a styrene-butadiene copolymer latex might be used to form an adhesive film which can follow dimensional changes caused by temperature changes. These adhesives, however, still fail to exhibit sufficient resistance to thermal shock or chemicals and undergo reduction in bonding strength to cause leakage of gasoline or water.

According to the state-of-the-art techniques, the problem of leakage is coped with by coating the insert with an epoxy resin or a vulcanized organopolysiloxane, but such a coating becomes useless in a short duration through repetition of temperature changes, electrical shocks or voltage application to electrical precision parts or pressure application (0.5 to 3 $kg/cm^2$) to motor oil, water, etc. Therefore, release takes place on the adherend surface or coated surface to cause liquid leakage, errors in operation, or failures in machinary.

SUMMARY OF THE INVENTION

One object of this invention is to provide a injection-molded composite laminate whose joint has resistance to thermal shocks and electrical shocks.

It has now been found that the above object of this invention can be accomplished by using an acrylate copolymer aqueous emulsion having a specific composition as a primer or adhesive.

The present invention relates to a process for producing a composite laminate comprising an insert part and an injection-molded resin part, which comprises coating the insert part with a primer comprising a copolymer aqueous emulsion having a glass transition point of not higher than 20° C. which is obtained by emulsion polymerization of a monomer mixture consisting mainly of (a) from 35 to 75% by weight of an alkyl acrylate having from 1 to 8 carbon atoms in the alkyl moiety thereof, (b) from 10 to 50% by weight of an alkyl methacrylate having from 1 to 4 carbon atoms in the alkyl moiety thereof, (c) up to 15% by weight of styrene and/or acrylonitrile, the sum of the (b) and (c) components ranging from 15 to 55% by weight, (d) up to 5% by weight of a vinyl monomer selected from the group consisting of an $\alpha,\beta$-unsaturated acid or an anhydride thereof, 2-hydroxyethyl (meth)acrylate, 2-hydroxypropyl (meth)acrylate, (meth)acrylamide, and methylol(meth)acrylamide, and (e) up to 30% by weight of other vinyl monomer(s), drying the primer, inserting the primer-coated insert part into a cavity of an injection mold, injecting a molten resin into the cavity to thereby unite the insert part and the injected resin molded part into one body.

In a preferred embodiment of the present invention, the surface of the insert part to be bonded to the injection-molded resin has grooves or projections to ensure laminate bonding strength to the injection-molded resin.

BRIEF DESCRIPTION OF THE ACCOMPANYING DRAWINGS

Figure 5:
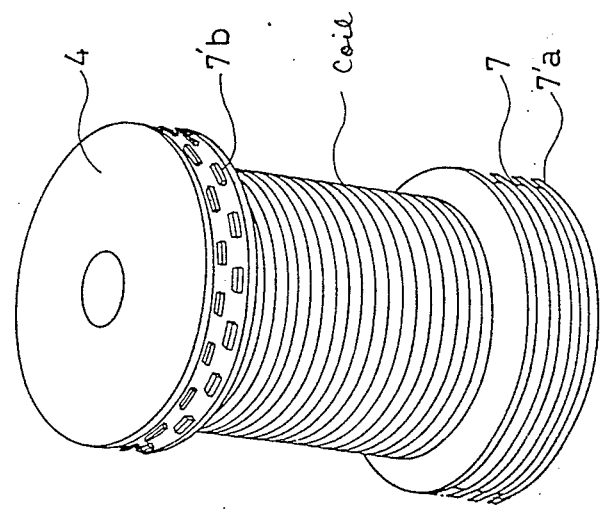
Figure 4:
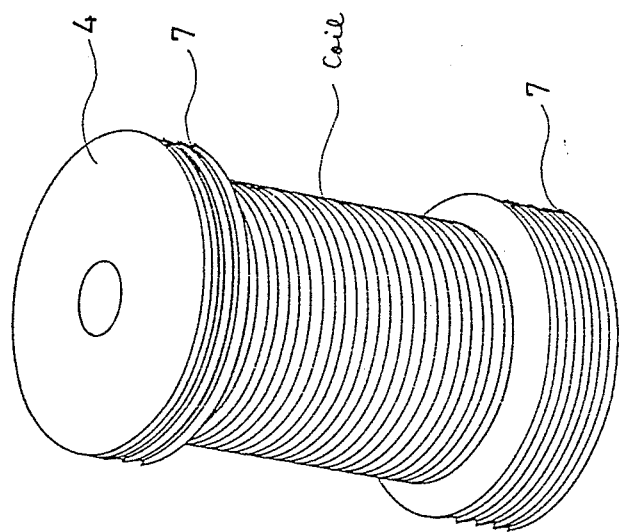

FIGS. 4 and 5 each illustrates a perspective view of of an example of an insert having grooves or projections on its surface to be bonded to engineering plastics.

Figure 6:
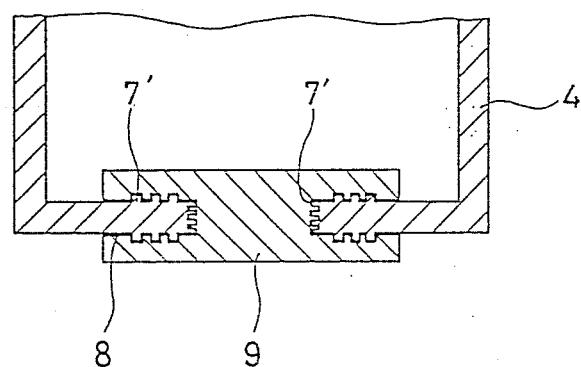
Figure 7:
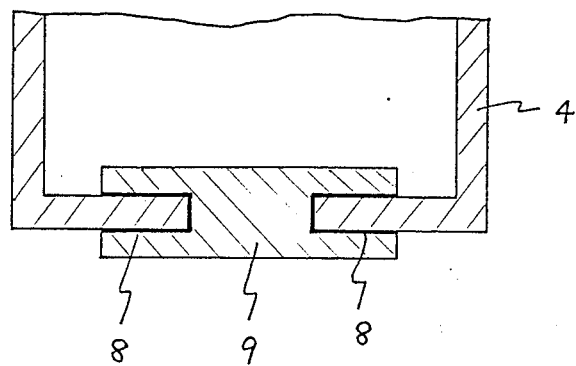

FIG. 6 and 7 show a section of another example of the composite laminate according to the present invention.

DETAILED DESCRIPTION OF THE INVENTION

The present invention is described below with reference to the accompanying drawings.

Figure 1:
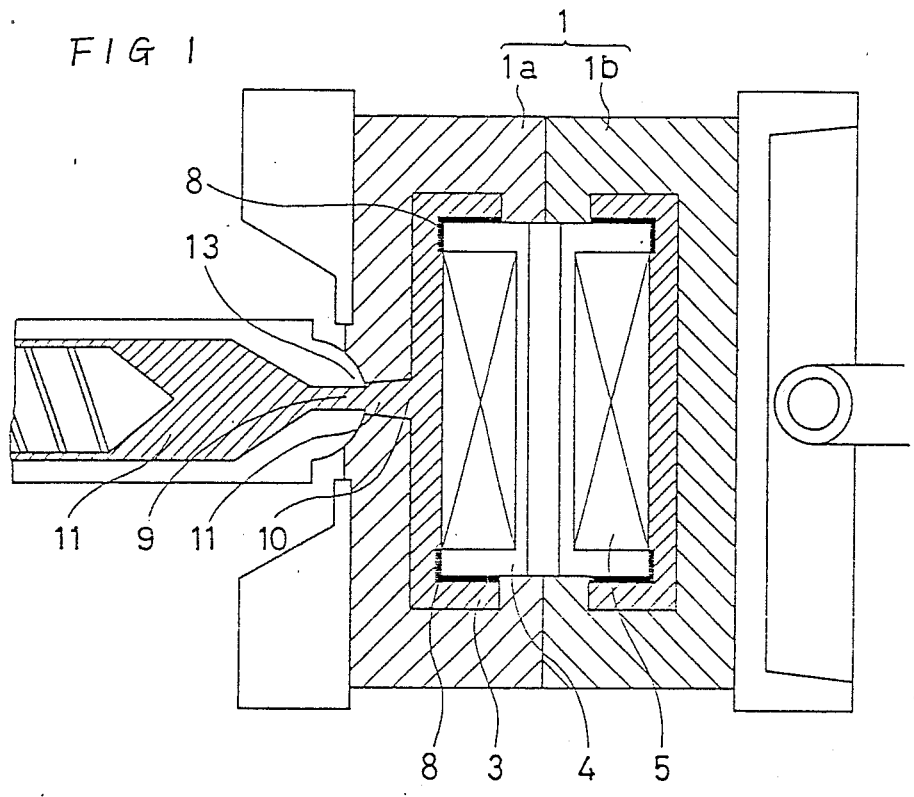
FIG. 1 illustrates a partial section of an injection molding machine to be used for carrying out the process of the present invention.

In FIG. 1, the numeral 1 indicates an injection mold composed of front mold 1a and rear mold 1b having releasing pins (not shown). The front mold 1a and the rear mold 1b form a cavity 3 in combination. The numeral 4 indicates an insert resin molded part having copper wire coil 5. Primer layer 8 is provided on the surface of the insert to be in contact with injected resin 9. The insert part 4 is fitted into the cavity of the rear mold 1b.

The front mold 1a is connected to plasticized resin 11 through passageway 10 (gate), and the passageway 10 is connected to the cavity 3.

Figure 2:
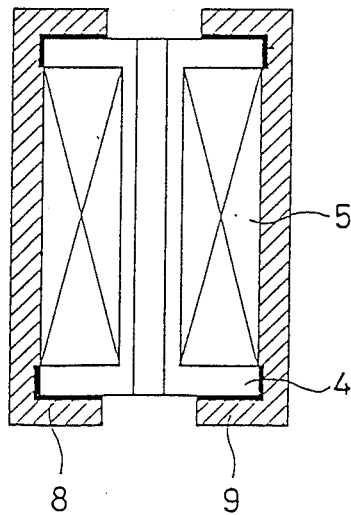
FIG. 2 illustrates a sectional view of a composite laminate according to the present invention which is produced by the use of the injection molding machine of FIG. 1.

Molten resin 9 injected from the injection molding machine at a pressure of from 500 to 2,000 kg/cm$^2$ fills the cavity 3 and is united with the insert resin molded part 4 into one body to form a composite molded article shown in FIG. 2.

Referring to FIGS. 4, 5 and 6, it is preferable to ensure anchorage between the insert and the injected resin by providing grooves 7 or a number of projections 7' on at least a peripheral surface of the insert to be bonded to the infected resin 9. The projections 7' may be either rings 7'a or a number of small projections 7'b. The insert may have a through-hole in which an infected resin may enter.

The insert part which can be applied to the present invention may be made of metals, ceramics, or resin moldings, or be composed of them.

Resin materials for the insert resin-molded part 4 include at least one of resins having a heat resistance of 150° C. or more selected from polyamide, polyacetal, polybutylene terephthalate, polyethylene terephthalate, polypropylene, polycarbonate, polysulfone, epoxy resins, polyimide, modified polyphenylene oxide, unsaturated polyester, thermoplastic polyurethane, and vulcanized rubber. These resins may contain additives, such as fillers, pigments, stabilizers, flame-retardants, ultraviolet absorbents, and the like.

The insert part may be made of a metal alone. The metallic materials for the insert part include steel, stainless steel, cooper, iron, zinc, brass, zinc-plated steel, aluminum, etc. The metallic insert part may be shaped in plate, cylinder, doughnut shape, tray, tube, rod, wire, etc. in agreement with the final product.

The insert part may have a through-hole into which the injected resin may penetrate.

The resin to be injected includes thermoplastic resins, e.g., polyamide, polyacetal, polybutylene terephthalate, polyethylene terephthalate, polyolefin, polycarbonate, modified polypghenylene oxide, thermoplastic polyurethane, vulcanized rubber, polymethyl methacrylate, polystyrene, ABS resin, etc.; and thermosetting resins, e.g., reactive epoxy resin, novalak resin, etc.

The rubbery component of the vulcanized rubber to be used as the insert or injected resin comprises one or more of natural rubber (NR) and synthetic rubbers having a carbon-carbon double bond in the strucutre. Implicit in the synthetic rubbers are homopolymers of a conjugated diene compound (e.g., isoprene, butadiene, chloroprene), e.g., polyisoprene rubber (IR), polybutadiene rubber (BR), polychloroprene rubber, etc.; copolymers of the above-described conjugated diene compound and a vinyl compound (e.g., styrene, acrylonitrile, vinylpyridine, acrylic acid, methacrylic acid, an alkyl acrylate, an alkyl methacrylate), e.g., styrene-butadiene copolymer rubber (SBR), vinylpyridine-butadiene-styrene copolymer rubber, acrylonitrile-butadiene copolymer rubber, acrylic acid-butadiene copolymer rubber, methacrylic acid-butadiene copolymer rubber, methyl acrylate-butadiene copolymer rubber, and methyl methacrylate-butadiene copolymer rubber; copolymers of an olefin (e.g., ethylene, propylene, isobutylene) and a diene compound, e.g., isobutylene-isoprene copolymer rubber (IIR); copolymers of an olefin and a non-conjugated diene (EPDM), e.g., an ethylene-propylene-cyclopentadiene terpolymer, an ethylene-propylene-5-ethylidene-2-norbornene terpolymer, and an ethylene-propylene-1,4-hexadiene terpolymer; polyalkenamers obtained by ring-opening polymerization of a cycloolefin, e.g., polypentenamer; and rubbers obtained by ring-opening polymerization of an oxirane ring, e.g., sulfur-vulcanizable polyepichlorohydrin rubber or polypropylene oxide rubber; and the like. Halides of these various rubbers, e.g., chlorinated isobutylene-isoprene copolymer rubber (Cl-IIR), and brominated isobutylene-isoprene copolymer rubber (Br-IIR), can also be used. Ring-opening polymers of norbornene can also be used.

The terminology "vulcanized rubber" as used herein means not only those obtained by sulfur vulcanization which is a generally adopted and most important vulcanization technique but those obtained by vulcanization using other organic sulfur compounds (e.g., dithiodimorpholine), thiuram compounds, peroxides, quinoids, resins, metal salts, metal oxides, polyamide, hexamethylenetetramine, etc. or radiation vulcanization.

In the present invention, the insert part is coated with a primer comprising an acrylic resin aqueous emulsion to form a primer layer prior to injection molding, the primer having a glass transition point of not higher than 20° C. and being obtained by emulsion polymerization of a monomer mixture consisting mainly of (a) from 35 to 75% by weight of an alkyl acrylate having from 1 to 8 carbon atoms in the alkyl moiety thereof, (b) from 10 to 50% by weight of an alkyl methacrylate having from 1 to 4 carbon atoms in the alkyl moiety thereof, (c) up to 15% by weight of styrene and/or acrylonitrile, the sum of the (b) and (c) components ranging from 15 to 55% by weight, (d) up to 5% by weight of a vinyl monomer selected from the group consisting of an $\alpha,\beta$-unsaturated acid or an anhydride thereof, 2-hydroxyethyl (meth)acrylate, 2-hydroxypropyl (meth)acrylate, (meth)acrylamide, and methylol(meth)acrylamide, and (e) up to 30% by weight of other vinyl monomer(s).

The film-forming resin aqueous emulsion to be used as a primer may be either non-crosslinkable or cold or heat crosslinkable.

The component (a) is a soft monomer functioning to impart flexibility to the resulting primer film. The thus imparted flexibility makes the primer film follow expansion and contraction due to a difference of coefficient of thermal expansion between the plastic or metallic insert and the injected resin.

Specific examples of the alkyl acrylate as the component (a) and a glass transition point (Tg) of a homopolymer thereof, designated in parentheses (hereinafter the same), are 2-ethylhexyl acrylate ($-85°$ C.), n-butyl acrylate ($-54°$ C.), ethyl acrylate ($-22°$ C.), isopropyl acrylate ($-5°$ C.), and methyl acrylate ($8°$ C.).

The alkyl methacrylate as the component (b), and styrene (100°) and acrylonitrile (100° C) as the component (c) are called hard monomers and each functions to impart toughness and heat resistance to the resulting primer film. It is necessary that a total proportion of these hard monomers should fall within a range of from 15 to 55% by weight of the monomer mixture.

Specific examples of the component (b) are methyl methacrylate (105° C.), ethyl methacrylate (65° C.), and n-butyl methacrylate (20° C.). From the viewpoint of adhesiveness of the primer, the proportion of the component (b) in the monomer mixture should be at least 10% by weight. The upper limit of the proportion of the component (b) is 55% by weight. If the proportion of the component (b) exceeds this upper limit, the primer film becomes so hard and brittle that it is easily released from the adherent surface or pin holes are apt to be formed in the film.

The proportion of the component (c) should be not more than 15% by weight. If it exceeds 15% by weight, the primer film has reduced bonding strength to the adherend. In addition, with acrylonitrile as the component (c), too a large amount makes it difficult to conduct emulsion polymerization.

The component (d), i.e., a vinyl monomer having a functional group, such as an acid group, a hydroxyl group or an amino group, serves to improve adhesion of the primer film to both adherends, the insert and the injected resin. The $\alpha,\beta$-unsaturated acid or an anhydride thereof includes acrylic acid, methacrylic acid, itaconic acid, maleic acid, maleic anhydride, etc. These vinyl monomers are used in an amount of not more than 5% by weight, preferably from 0.3 to 3% by weight, based on the monomer mixture.

The component (e) is used when necessary to adjust the balance between elasticity and toughness of the primer film, to adjust the glass transition point of the copolymer emulsion at 20° C. or lower, or to make the emulsion cold crosslinkable. Such a monomer includes butanediol diacrylate, butanediol monoacrylate, vinyl chloride, vinyl acetate (30° C.), glycidyl methacrylate, diacetonacrylamide, acrolein, etc. The component (e) is used in an amount of not more than 30% by weight based on the monomer mixture.

A preferred primer in the present invention is a cold crosslinkable aqueous emulsion comprising (A) an emulsion of an acrylate copolymer obtained from a monomer mixture containing from 0.1 to 20% by weight of a component (e) selected from vinyl monomers having an aldehyde group ($-CHO$) or a carbonyl group ($C=O$), e.g., diacetonacrylamide, acrolein, formylstyrene, vinyl methyl ketone, vinyl ethyl ketone, acryloxyalkyl (having from 1 to 3 carbon atoms in the alkyl moiety thereof) propanal, diacetone acrylate, etc., having incorporated therein (B) a crosslinking agent, such as a hydrazine derivative having at least two hydrazino groups ($-NHNH_2$), e.g., adipic acid dihydrazide, sebacic acid dihydrazide, isophthalic dihydrazide, hydrazine polymers containing at least two hydrazino groups, etc.

The copolymer aqueous emulsion for primer layer formation can be prepared by emulsion polymerization in a system comprising the above-described monomer mixture, a surface active agent, a polymerization initiator, and water. The monomer concentration of the system preferably ranges from 40 to 60% by weight. The surface active agent and the polymerization initiator are preferably used in amounts of from 1 to 5 parts by weight and from 0.1 to 0.6 part by weight, respectively, based on the monomer mixture. The surface active agent to be used should be chosen so as to help smooth progress of the emulsion polymerization. In this respect, particularly preferred surface active agents are mixtures of polyoxyethylene alkyl ethers or polyoxyethylene alkylphenol ethers having 10 to 60 mols of an oxyethylene group added and higher alcohol sulfuric ester salts or polyoxyethylene alkyl sulfate salts or polyoxyethylene alkylphenyl sulfate salts, etc. The polymerization initiator preferably includes potassium persulfate, ammonium persulfate, and redox systems composed of these persulfates and a reducing agent. In view of improvement on dispersion stability, the resulting copolymer emulsion is preferably adjusted to a pH of 7 or higher with aqueous ammonia or the like.

The glass transition point of the copolymer is 20° C. or lower, preferably between $-18°$ C. and $+10°$ C. If Tg exceeds 20° C., the primer film requires much drying time. In general, the higher the Tg, the higher the strength of the film; and the lower the Tg, the higher the elasticity and flexibility of the film.

The above-described primer is coated on the surface of the insert part to a coverage of from 10 to 100 g/m² and dried. The insert having the primer layer is inserted into a cavity of a mold preheated to 40 to 120° C., and a thermoplastic resin (inclusive of vulcanized rubber) or a reactive thermosetting resin in a molten state is then injected into the cavity under a pressure of from 500 to 1,500 kg/cm$^2$.

The injection molding temperature for the thermoplastic resins varies depending on the kind of the resin. Typically, it is from 250 to 290° C. for polyamide, from 190 to 220° C. for polyacetal, from 250 to 270° C. for polybutylene terephthalate, 260 to 300° C. for polycarbonate, 250 to 270° C. for polyethylene terephthalate, 180 to 230° C. for polypropylene, and 180 to 230° C. for polyvinyl chloride. The injection molding using the thermosetting resins is carried out at a temperature of from room temperature to 130° C.

The present invention is now illustrated in greater detail with reference to the following Examples and Comparative Examples, but it should be understood that the present invention is not deemed to be limited thereto. In these examples, all the percents and parts are by weight unless otherwise indicated.

PREPARATION EXAMPLE 1

The following components were charged in a reaction vessel equipped with a temperature controller, an anchor agitator, a reflux condenser, a feeder, a thermometer, and a tube for introducing nitrogen.

| | |
|---|---|
| Water | 200 parts |
| 35% aqueous solution of a sodium salt of a sulfuric half ester of p-nonlylphenol having reacted with 20 mols of ethylene oxide (anionic emulsifier) | 5 parts |
| 20% aqueous solution of p-nonlyphenol having reacted with 25 mols of ethylene oxide (nonionic emulsifier) | 20 parts |

The reaction vessel was then purged with nitrogen, and 10% of a mixture (I) consisting of the following components was added thereto, followed by heating to 90° C. Mixture I:

| Mixture I: | |
|---|---|
| Water | 200 parts |
| 35% aqueous solution of the same anionic emulsifier as used above | 25 parts |
| Methyl methacrylate | 160 parts (40%) |

| Mixture I: | |
|---|---|
| n-Butyl acrylate | 204 parts (51%) |
| Acrylic acid | 20 parts (5%) |
| Acrylamide | 16 parts (4%) |

In the reaction vessel was further charged 10% of a solution (II) consisting of 85 parts of water and 2.5 parts of potassium persulfate. Then, the rest of the mixture (I) and 90% of the solution (II) were fed to the vessel over 3.5 hours. After the feeding, the mixture was kept at 90° C. for 2 hours to polymerize the mixture (I). There was obtained an anionic resin aqueous emulsion (Tg: 3° C.). The resulting emulsion was designated as Emulsion No. 1.

PREPARATION EXAMPLES 2 TO 7

Emulsion Nos. 2 to 7 were prepared in the same manner as in Preparation Example 1, except for changing the kind and amount of the vinyl monomers as shown in Table 1.

PREPARATION EXAMPLE 8

An aqueous emulsion of an acrylate copolymer containing a carbonyl group was prepared in the same manner as in Example 1, except for changing the kind and amount of the vinyl monomers as shown in Table 1. To 100 parts of the resulting aqueous emulsion was added 0.8 part of adipic acid dihydrazide to prepare a cold crosslinkable aqueous emulsion. The resulting emulsion was designated as Emulsion No. 8.

PREPARATION EXAMPLES 9 TO 11

Comparative copolymer aqueous emulsions were prepared in the same manner as in Example 1, except for changing the kind and amount of the vinyl monomers as shown in Table 1. The resulting emulsions were designated as Emulsion Nos. 9 to 11. Abbreviations used in Table 1 have the following meanings:
MMA methyl methacrylate
BMA n-butyl methacrylate
St styrene
AN acrylonitrile
BA butyl acrylate
2-EHA: 2-ethylhexyl acrylate
AA acrylic acid

TABLE 1

| | Emulsion No. | | | | | | | | | | |
|---|---|---|---|---|---|---|---|---|---|---|---|
| | 1 | 2 | 3 | 4 | 5 | 6 | 7 | 8* | 9 | 10 | 11 |
| Monomer Mixture (wt %): | | | | | | | | | | | |
| MMA | 40 | 30 | 30 | 30 | 30 | 30 | 45 | 48 | — | 20 | 70 |
| BMA | — | — | — | 20 | 20 | 20 | — | — | — | — | — |
| St | — | 10 | — | — | — | — | — | — | 40 | 20 | — |
| AN | — | — | 10 | — | — | — | — | — | — | — | — |
| BA | 51 | 51 | 51 | 41 | — | — | 55 | — | 51 | 51 | — |
| 2-EHA | — | — | — | — | 41 | 41 | — | — | — | — | 21 |
| AA | 5 | 5 | 5 | 5 | 5 | 5 | — | 2 | 5 | 5 | 5 |
| 2-Hydroxyethyl acrylate | — | — | — | — | — | 4 | — | 43 | — | — | — |
| Acrylamide | 4 | 4 | 4 | 4 | 4 | — | — | 2 | 4 | 4 | 4 |
| Acrolein | — | — | — | — | — | — | 5 | — | — | — | — |
| Tg (°C.) of Emulsion | 3 | 3 | 3 | 6 | −16 | −17 | −3 | 7 | 2 | 3 | 40 |

*Emulsion No. 8 contains adipic acid dihydride

EXAMPLE 1

A coil bobbin of a solenoid valve composed of a nylon 66 bobbin having four V-shaped grooves at 0.2 mm intervals on the side wall thereof as shown in FIG. 4 was used as an insert resin molded part. Emulsion No. 1 was coated on the grooved side wall of the bobbin to a solid coverage of 30 g/m² and dried for 2 hours. The insert part was fitted to a rear cavity of an injection molding machine as shown in FIG. 1, and nylon 6 was then injected into the cavity at a resin temperature of 280° C. under a pressure of 500 kg/cm² to obtain a cylindrical composite laminate of FIG. 2. The composite laminate had an outer diameter of 25 mm, a height of 35 mm, and the nylon 6 part had a thickness of 1 mm.

Airtightness between the injected part (nylon 6) and the insert part (nylon 66) of the resulting composite laminate was evaluated according to the following test methods.

Figure 3:
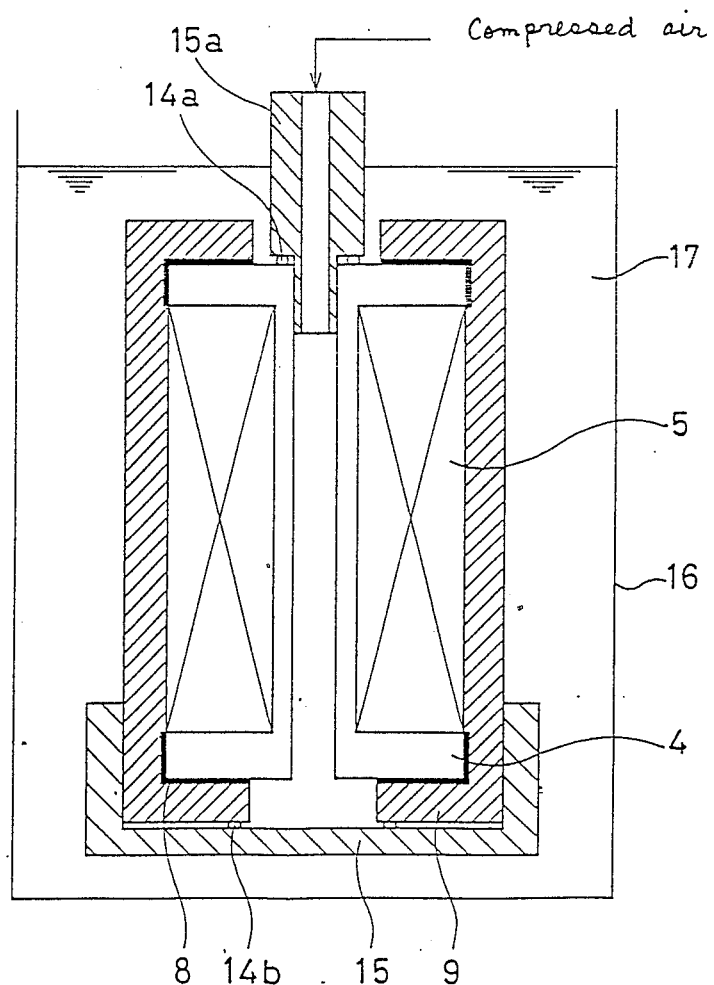
FIG. 3 illustrates a partial section of an equipment for testing airtightness of the composite laminate according to the present invention.

(1) Airtightness at 20° C.:

As shown in FIG. 3, the composite laminate was put in a water tank 16 by means of clamps 15, 15a. Packings 14a, 14b were used in order to prevent infiltration of water. Air was introduced from the top of the bobbin under pressure. Airtightness was judged by generation of bubbles from the primer layer As a result of this test, the composite laminate was proved resistant to air pressure of 7 kg/cm².

(2) Airtightness After Immersion in Motor Oil:

After being immersed in a motor oil bath at 100° C. for 1 day, the composite laminate was subjected to the airtightness test in the same manner as in 1) above. As a result, the composite laminate was proved resistant to air pressure of 6 kg/cm².

(3) Airtightness After Receiving Thermal Shock:

The composite laminate was immersed in a motor oil bath at 20° C. for 2 hours. The motor oil bath was heated up to 80° C. over 15 minutes, and the composite laminate was further immersed at that temperature for an additional period of 2 hours. Then, the motor oil bath was cooled to 20° C. over 30 minutes, and the immersion was continued at 20° C. for 2 hours. The motor oil was again heated up to 80° C., at which the immersion was continued for 2 hours. The above-described heating and cooling step was repeated 5 times to give thermal shocks to the composite laminate. The composite laminate thus having recieved such thermal shocks was subjected to the airtightness test in the same manner as in 1) above and, as a result, was turned to be resistant to air pressure of 6 kg/cm².

COMPARATIVE EXAMPLE 1

A composite laminate was produced in the same manner as in Example 1, except that no primer was applied to the insert. The results of the airtightness tests are shown below.

Test (1): 1 kg/cm² or less
Test (2): 1 kg/cm² or less
Test (3): 1 kg/cm² or less

EXAMPLE 2

A composite laminate was produced in the same manner as in Example 1, except for changing the resin of the bobbin 4 and the injected resin as shown in Table 2.

The results of the airtightness tests (1) to (3) are shown in Table 2.

TABLE 2

| Run No. | Resin of Insert Part | Injected Resin | Injection Condition Temperature (°C.) | Injection Condition Pressure (kg/cm²) | Airtightness (kg/cm²) Test (1) | Test (2) | Test (3) |
|---|---|---|---|---|---|---|---|
| 1 | polybutylene terephthalate | polybutylene terephthalate | 280 | 700 | 6 | 5 | 5 |
| 2 | FRP | epoxy resin | 20 | 500 | 6 | 6 | 6 |
| 3 | modified polyphenylene oxide | modified polyphenylene oxide | 300 | 1000 | 6 | — | — |
| 4 | polyethylene terephthalate | polyethylene terephthalate | 300 | 1000 | 6 | 6 | 6 |
| 5 | FRP | polyethylene terephthalate | 300 | 1000 | 6 | 6 | 6 |
| 6 | polyimide | polyamide | 280 | 700 | 6 | 5 | 5 |
| 7 | polyacetal | polyacetal | 200 | 700 | 5 | 4 | 4 |
| 8 | polyacetal | polypropylene | 210 | 600 | 5 | 4 | 4 |
| 9 | polypropylene | polypropylene | 210 | 600 | 5 | 4 | 4 |
| 10 | polycarbonate | polycarbonate | 280 | 1000 | 6 | — | — |
| 11 | polysulfone | polyamide | 280 | 700 | 6 | 6 | 5 |
| 12 | polyamide | polyamide | 280 | 700 | 7 | 6 | 6 |
| 13 | vulcanized rubber | polyamide | 280 | 500 | 6 | 5 | 5 |
| 14 | thermoplastic polyurethane | thermoplastic polyurethane | 200 | 800 | 6 | 5 | 5 |

EXAMPLES 3 TO 10

A cylindrical metallic insert part 4 made of zinc plating, stainless steel or brass was used. The insert part had a wall thickness of 1 mm, a body diameter of 60 mm, and a core diameter of 30 mm and had a number of projections 7' on its surface as shown in FIG. 6.

Each of Emulsion Nos. 1 to 8 was coated as a primer on the surface of the coil bobbin to a solid coverage of 30 g/m² and allowed to dry for 2 hours. The coil bobbin was fitted to the injection mold by means of magnetism, and nylon 6 was then injected into the mold at 280° C. under a pressure of 500 kg/cm² to obtain a composite laminate having a 3 mm thick nylon layer.

COMPARATIVE EXAMPLES 2 TO 6

A composite laminate was produced in the same manner as in Example 3, except for using, as a primer, a polyester resin emulsion produced by T Company (Tg: −20° C.) (abbreviated as PS), an SBR latex produced by N Company (Tg: 6° C.) (abbreviated as SBR), an acrylonitrile-butadiene rubber latex produced by N Company (Tg: −25° C.) (abbreviated as ABR), a two-liquid epoxy resin adhesive produced by Y Company (abbreviated as EX), or a phenolic resin adhesive produced by S Company (abbreviated as PH).

Each of the composite laminates produced by Examples 3 to 10 and Comparative Examples 2 to 6 was subjected to the same tests as in Example 1. The airtightness of the composite laminate was rated according to the following rating system, and the results obtained are shown in Table 3.

| Excellent | Resistant to air pressure of 5 kgf/cm$_2$ or more |
|---|---|
| Good | Resistanst to air pressure of from 3 to 5 kgf/cm$^2$ |
| Medium | Resistant to air pressure of from 1 to 3 kgf/cm$^2$ |
| Poor | Resistant to air pressure of 1 kgf/cm$^2$ or less |

(3) Peel Strength After Receiving Thermal Shock:

The composite laminate was immersed in a motor oil bath at 20° C. for 2 hours. Then, the motor oil bath was heated to 80° C. over 15 minutes, and the composite laminate was further immersed at that temperature for 2 hours. The motor oil bath was cooled to 20° C. over 30 minutes, at which the immersion was continued for an additional period of 2 hours. The motor oil bath was again heated up to 80° C. at which the immersion was continued for additional 2 hours. The above-described heating and cooling step was repeated 5 times. The composite laminate thus having received thermal shocks was found to have a peel strength of 33 kg/cm$^2$ as determined in the same manner as (1) above.

Composite laminates were produced in the same manner as described above, except for using a stainless steel insert or a brass insert in plate of the zinc-plated steel insert.

TABLE 3

| | | Airtightness | | | | | | | | |
|---|---|---|---|---|---|---|---|---|---|---|
| | | Test (1) | | | Test (2) | | | Test (3) | | |
| Example No. | Emulsion No. | Zn-plated | Stainless Steel | Brass | Zn-Plated | Stainless Steel | Brass | Zn-Plated | Stainless Steel | Brass |
| Example 3 | 1 | excellent | excellent | excellent | excellent | excellent | excellent | excellent | excellent | excellent |
| Example 4 | 2 | good | good | good | good | good | good | good | good | good |
| Example 5 | 3 | good | good | good | good | good | good | good | good | good |
| Example 6 | 4 | excellent | excellent | excellent | excellent | excellent | excellent | excellent | excellent | excellent |
| Example 7 | 5 | excellent | excellent | excellent | excellent | excellent | excellent | excellent | excellent | excellent |
| Example 8 | 6 | excellent | excellent | excellent | excellent | excellent | excellent | excellent | excellent | excellent |
| Example 9 | 7 | excellent | excellent | excellent | excellent | excellent | excellent | excellent | excellent | excellent |
| Example 10 | 8 | excellent | excellent | excellent | excellent | excellent | excellent | excellent | excellent | excellent |
| Comparative Example 2 | PS | poor | poor | poor | poor | poor | poor | poor | poor | poor |
| Comparative Example 3 | SBR | poor | poor | poor | poor | poor | poor | poor | poor | poor |
| Comparative Example 4 | ABR | good | good | good | good | good | good | poor | poor | poor |
| Comparative Example 5 | EX | poor | poor | poor | poor | poor | poor | poor | poor | poor |
| Comparative Example 6 | PH | poor | poor | poor | poor | poor | poor | poor | poor | poor |

EXAMPLE 11

Emulsion No. 1 was coated on 15 pieces of a 1mm thick zinc-plated steel plate to a solid coverage of 30 g/m$^2$ and allowed to dry for 2 hours. The insert piece was fitted to an injection mold by means of magnetism, and Ultraform N2320 (a polyacetal produced by BASF) at 208° C. under a pressure of 500 kg/cm$^2$ to obtain a composite laminate having a 2 mm thick polyacetal layer.

(1) Peel Strength at 20° C.:

The peel strength between the polyacetal layer and the zinc-plated steel plate was determined at 20° C. in accordance with JIS K-6850. It was found to be 23 kgf/cm$^2$.

(2) Peel Strength After Immersion in Motor Oil:

The composite laminate was immersed in a motor oil bath at 100° C. for 1 day and then determined for peel strength in the same manner as in (1) above. As a result, the composite laminate was found to have a peel strength of 24 kgf/cm$^2$.

EXAMPLES 12 TO 17

Composite laminates were produced in the same manner as in Example 11, except for replacing Emulsion No. 1 with each of Emulsion Nos. 2 to 7.

COMPARATIVE EXAMPLES 7 TO 14

Composite laminates were produced in the same manner as in Example 11, except for replacing Emulsion No. 1 with each of Emulsion Nos. 9 to 11 and the adhesives used in Comparative Examples 2 to 6.

Each of the composite laminates of Examples 11 to 16 and Comparative Examples 7 to 15 was subjected to the same peel tests as in Example 11 to evaluate laminate bonding strength between the metalic insert and the polyacetal resin. Evaluations were made according to the following rating system:

| Excellent | peel strength of from 26 to 35 kgf/cm$^2$ |
|---|---|
| Good | peel strength of from 20 to 25 kgf/cm$^2$ |
| Medium | peel strength of from 10 to 15 kgf/cm$^2$ |
| Poor | peel strength of from 3 to 7 kgf/cm$^2$ |

TABLE 4

| Example No. | Emulsion No. | Peel Strength | | | | | | | | |
|---|---|---|---|---|---|---|---|---|---|---|
| | | Test (1) | | | Test (2) | | | Test (3) | | |
| | | Zn-Plated | Stainless Steel | Brass | Zn-Plated | Stainless Steel | Brass | Zn-Plated | Stainless Steel | Brass |
| Example 11 | 1 | good | good | good | good | good | good | good | good | good |
| Example 12 | 2 | good | good | good | medium | medium | medium | medium | medium | medium |
| Example 13 | 3 | good | good | good | medium | medium | medium | medium | medium | medium |
| Example 14 | 4 | good | good | good | good | good | good | good | good | good |
| Example 15 | 5 | excellent | excellent | excellent | excellent | excellent | excellent | excellent | excellent | excellent |
| Example 16 | 6 | excellent | excellent | excellent | excellent | excellent | excellent | excellent | excellent | excellent |
| Example 17 | 7 | good | good | good | good | good | good | good | good | good |
| Comparative Example 7 | 9 | poor | poor | poor | poor | poor | poor | poor | poor | poor |
| Comparative Example 8 | 10 | poor | poor | poor | poor | poor | poor | poor | poor | poor |
| Comparative Example 9 | 11 | excellent | excellent | excellent | excellent | excellent | excellent | poor | poor | poor |
| Comparative Example 10 | PS | poor | poor | poor | poor | poor | poor | poor | poor | poor |
| Comparative Example 11 | SBR | poor | poor | poor | poor | poor | poor | poor | poor | poor |
| Comparative Example 12 | ABR | poor | poor | poor | good | good | good | poor | poor | poor |
| Comparative Example 13 | EX | poor | poor | poor | medium | medium | medium | poor | poor | poor |
| Comparative Example 14 | PH | poor | poor | poor | poor | poor | poor | poor | poor | poor |

EXAMPLE 18

Emulsion No. 1 was coated on 15 pieces of a 1mm thick zinc-plated steel plate to a solid coverage of 30 g/m² and allowed to dry for 2 hours. The insert piece was fitted to an injection mold by means of magnetism, and polybutylene terephthalate was injected into the mold at 280° C. under a pressure of 500 kg/cm² to obtain a composite laminate having a 2 mm thick polybutylene terephthalate layer.

The resulting laminate was subjected to the same peel tests as in Example 11. As a result, the peel strengths (1), (2), and (3) were found to be 23 kgf/cm², 24 kgf/cm², and 33 kg/cm², respectively.

Composite laminates were produced in the same manner as described above, except for using a stainless steel plate or a brass plate in place of the zinc-plated steel plate, and each of the resulting laminates was subjected to the same peel tests as in Example 11. The results obtained are shown in Table 5.

EXAMPLES 19 TO 24

Composite laminates were produced in the same manner as in Example 18, except for replacing Emulsion No. 1 with each of Emulsions 2 to 7. The results of the peel tests (1), (2), and (3) are shown in Table 5.

COMPARATIVE EXAMPLES 15 TO 21

Composite laminates were produced in the same manner as in Example 18, except for replacing Emulsion No. 1 with each of Emulsion Nos. 9 to 11 and the adhesives used in Comparative Examples 2 to 6. The results of the peel tests (1), (2), and (3) are shown in Table 5.

TABLE 5

| Example No. | Emulsion No. | Peel Strength | | | | | | | | |
|---|---|---|---|---|---|---|---|---|---|---|
| | | Test (1) | | | Test (2) | | | Test (3) | | |
| | | Zn-Plated | Stainless Steel | Brass | Zn-Plated | Stainless Steel | Brass | Zn-Plated | Stainless Steel | Brass |
| Example 18 | 1 | good | good | good | good | good | good | good | good | good |
| Example 19 | 2 | good | good | good | medium | medium | medium | medium | medium | medium |
| Example 20 | 3 | good | good | good | medium | medium | medium | medium | medium | medium |
| Example 21 | 4 | good | good | good | good | good | good | good | good | good |
| Example 22 | 5 | excellent | excellent | excellent | excellent | excellent | excellent | excellent | excellent | excellent |
| Example 23 | 6 | excellent | excellent | excellent | excellent | excellent | excellent | excellent | excellent | excellent |
| Example 24 | 7 | good | good | good | good | good | good | good | good | good |
| Comparative Example 15 | 9 | poor | poor | poor | poor | poor | poor | poor | poor | poor |
| Comparative Example 16 | 10 | poor | poor | poor | poor | poor | poor | poor | poor | poor |
| Comparative Example 17 | 11 | excellent | excellent | excellent | excellent | excellent | excellent | poor | poor | poor |
| Comparative Example 18 | PS | poor | poor | poor | poor | poor | poor | poor | poor | poor |
| Comparative Example 19 | SBR | poor | poor | poor | poor | poor | poor | poor | poor | poor |
| Comparative Example 20 | ABR | poor | poor | poor | good | good | good | poor | poor | poor |
| Comparative Example 21 | EX | poor | poor | poor | medium | medium | medium | poor | poor | poor |
| Comparative Example 22 | PH | poor | poor | poor | poor | poor | poor | poor | poor | poor |

EXAMPLE 25

Composite laminates comprising a metallic insert and polyethylene terephthalate were produced in the same manner as in Examples 18 to 24 and Comparative Examples 15 to 21, except for using polyethylene terephthalate in place of polybutylene terephthalate. When each of the resulting laminates was tested in the same manner as in Example 18, the results were equal to those shown in Table 5.

While the invention has been described in detail and with reference to specific embodiments thereof, it will be apparent to one skilled in the art that various changes and modifications can be made therein without departing from the spirit and scope thereof.

What is claimed is:

1. A process for producing a composite laminate comprising an insert part and an injection-molded resin part, which comprises coating the insert part with a primer comprising a copolymer aqueous emulsion having a glass transition point of not higher than 20° C. which is obtained by emulsion polymerization of a monomer mixture consisting mainly of (a) from 35 to 75% by weight of an alkyl acrylate having from 1 to 8 carbon atoms in the alkyl moiety thereof, (b) from 10 to 50% by weight of an alkyl methacrylate having from 1 to 4 carbon atoms in the alkyl moiety thereof, (c) up to 15% by weight of styrene and/or acrylonitrile, the sum of the (b) and (c) components ranging from 15 to 55% by weight, (d) up to 5% by weight of a vinyl monomer selected from the group consisting of an α,β-unsaturated acid or an anhydride thereof, 2-hydroxyethyl (meth)acrylate, 2-hydroxypropyl (meth)acrylate, (meth)acrylamide, and methylol(meth)acrylamide, and (e) up to 30% by weight of other vinyl monomer(s), drying the primer, inserting the insert part into a cavity of an injection mold, injecting a molten resin into the cavity to thereby form the injection-molded resin part and unite the insert part and the injection-molded resin part into one body.

2. A process as claimed in claim 1, wherein said aqueous emulsion has a glass transition point of from −18° C. to +10° C.

3. A process as claimed in claim 1, wherein said aqueous emulsion is a cold crosslinkable aqueous emulsion comprising (A) an emulsion of an acrylate copolymer obtained from the monomer mixture containing from 0.1 to 20% by weight of the component (e) selected from vinyl monomers having an aldehyde group (—CHO) or a carbonyl group

having incorporated therein (B) a crosslinking agent selected from, hydrazine derivatives having at least two hydrazino groups (—NHNH$_2$).

4. A process is claimed in claim 1, wherein said insert part is prepared from a resin selected from the group consisting of polyamide, polyacetal, polybutylene terephthalate, polyethylene terephthalate, polyolefins, polyvinyl chloride, polycarbonate, polysulfone, epoxy resins, polyimide, modified polyphenylene oxide, unsaturated polyester, thermoplastic polyurethane, and vulcanized rubber.

5. A process as claimed in claim 1, wherein said insert part is made of brass, stainless steel, zinc or copper.

6. A process as claimed in claim 1, wherein said insert part has a side wall and grooves or projections for anchorage on at least the side wall.

7. A process as claimed in claim 1, wherein said injected resin is selected from the group consisting of polyamide, polyacetal, polybutylene terephthalate, polyethylene terephthalate, polyolefins, polycarbonate, epoxy resins, novolak resins, modified polyphenylene oxide, thermoplastic polyurethane, and vulcanized rubber.

* * * * *

UNITED STATES PATENT AND TRADEMARK OFFICE
CERTIFICATE OF CORRECTION

PATENT NO. : 4,957,677
DATED : SEPTEMBER 18, 1990
INVENTOR(S) : NAOYUKI KATOH ET AL.

It is certified that error appears in the above-identified patent and that said Letters Patent is hereby corrected as shown below:

On Title Page:

In the Foreign Application Priority Data, please delete "May 9, 1988 Japan ................63-112114" and insert --May 9, 1988 Japan ...............63-112144--.

Signed and Sealed this

Tenth Day of March, 1992

Attest:

HARRY F. MANBECK, JR.

*Attesting Officer*      *Commissioner of Patents and Trademarks*